(12) United States Patent
Chu

(10) Patent No.: US 6,459,665 B2
(45) Date of Patent: Oct. 1, 2002

(54) SIGNAL COMPENSATION FOR HIGH-SPEED OPTICAL STORAGE DEVICE

(75) Inventor: Meng-Huang Chu, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 112 days.

(21) Appl. No.: 09/754,461

(22) Filed: Jan. 4, 2001

(30) Foreign Application Priority Data

Feb. 25, 2000 (TW) ........................................ 89103353 A

(51) Int. Cl.⁷ .................................................. G11B 7/00
(52) U.S. Cl. ................................................... 369/44.35
(58) Field of Search ............................ 369/44.29, 44.32, 369/44.35, 44.36, 47.36, 47.38, 47.44, 47.45, 53.28, 53.3, 53.4, 53.43; 360/78.04

(56) References Cited

U.S. PATENT DOCUMENTS 4,942,564 A * 7/1990 Hofer et al. .............. 369/53.28
5,914,829 A * 6/1999 Kadlec et al. ........... 360/78.04

\* cited by examiner

*Primary Examiner*—Paul W. Huber
(74) *Attorney, Agent, or Firm*—J.C. Patents

(57) ABSTRACT

A device for compensating the error signal produced by a high-speed disk system. The error signal is fed to a compensator and a bandpass filter respectively. The processed signals produced by the compensator and the bandpass filter are summed to output a compensated signal. The bandpass filter processes the rotating frequency portion of the error signal. The compensator includes a lead compensator and a lag compensator either serially connected or parallel connected.

18 Claims, 6 Drawing Sheets

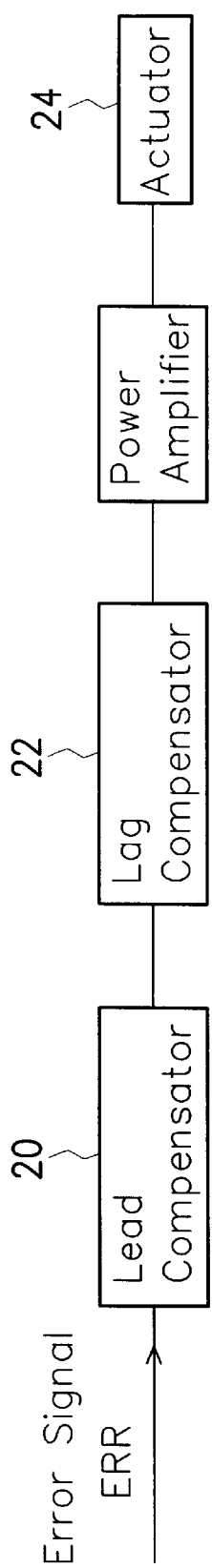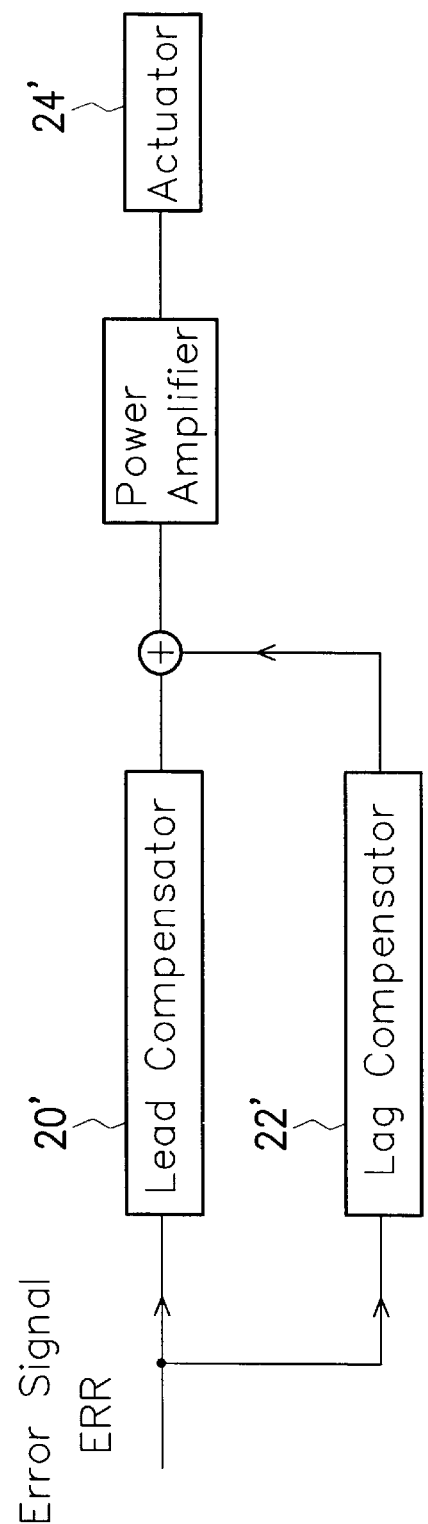
FIG. 2A (PRIOR ART)
FIG. 2B (PRIOR ART)

SIGNAL COMPENSATION FOR HIGH-SPEED OPTICAL STORAGE DEVICE

CROSS-REFERENCE TO RELATED APPLICATION

This application claims the priority benefit of Taiwan application serial no. 89103353, filed Feb. 25, 2000.

BACKGROUND OF THE INVENTION

1. Field of Invention

The present invention relates to a method for compensating digital signal. More particularly, the present invention relates to a method for compensating the digital signal produced by a high speed of optical storage device.

2. Description of Related Art

Due to the rapid development of multimedia systems, optical storage device has become standard equipment in personal computers. To process ever-increasing quantities of image and audio data, rotating speed of the optical storage device has gone up tremendously. In general, part of the error signal from an optical device comes from the rotating frequency signal of the motor. When the optical disk spins fast, magnitude resulting from side effects also increases significantly. Hence, the error signal must be compensated properly.

FIG. 1 is a block diagram showing the architecture of a conventional focus and track servo system. The focus and track servo system includes an optical sensor 10, a signal pre-amplifier 12, a compensator 14, a power amplifier 16 and an actuator & lens module 18. The optical sensor 10 picks up focus error (FE) signal and lens position signal fed back from the lens of the optical pickup head to generate a plurality of signals to the signal pre-amplifier 12. Output signal from the signal pre-amplifier 12 is combined with the disk wobble & vibration signal before feeding into the compensator 14. Signal compensation is conducted inside the compensator 14. The compensated signal is transferred to the power amplifier 16, for amplification. The amplified signal is then transferred to the actuator & lens module 18 for producing lens position signal that drives the optical pickup head.

In general, error signal is compensated by a lead compensator and a lag compensator. Typically, the lead compensator is a differentiator circuit such as a high frequency filter capable of stabilizing any input signal. In contrast, the lag compensator is an integrator circuit capable of lowering the steady state error of low frequency signals.

FIGS. 2A and 2B are two different conventional lead-lag compensator architectures. FIG. 2A is a block diagram of a serially connected lead-lag compensator while FIG. 2B is a block diagram of a parallel-connected lead-lag compensator. As shown in FIG. 2A, the error signal is input into a lead compensator 20 and then a lag compensator 22. The output signal from the lag compensator 22 is passed to a power amplifier and then transferred to an actuator 24. On the other hand, as shown in FIG. 2B, the error signal is sent to a lead compensator 20' and a lag compensator 22' concurrently. Output signals from the lead compensator 20' and the lag compensator 22' are summed before passing to a power amplifier. output signal from the power amplifier is transferred to an actuator 24'.

As the rotating speed of an optical storage device increases, problems caused by insufficient bandwidth are more serious. Because the motor turns very fast, the rotating frequency may be too high for the lag compensator. Hence, when the aforementioned architectures are used to compensate for the error signal, the lead compensator and the lag compensator can hardly lower the steady state error at rotating frequency (the rotating frequency of the spindle motor for driving the optical storage device).

In addition, due to the high rotating frequency of the driving motor and the non-overlapping of amplified frequency bandwidths between the lead compensator and the lag compensator, suitable compensation is difficult to generate.

In the design of actuator for an optical disk system, secondary resonance problem may persist. Consequently, the lead compensator may be limited by second resonance, resulting in the inability to produce higher amplification of frequency and magnitude by the lead compensator. With a poor lead compensator design, a high frequency noise may be produced by the actuator. In the meantime, since the lead compensator can only amplify localized frequency, frequency bandwidth from the lag compensator may be compressed. Hence, conventional lead-lead compensator architecture can hardly meet the specification of optical device, especially in high speed optical storage device.

SUMMARY OF THE INVENTION

Accordingly, one object of the present invention is to provide a signal compensation device for a high-speed optical storage device capable of processing the error signal at the high-speed rotating frequency.

A second object of this invention is to provide a signal compensation device for a high-speed optical disk system capable of processing the error signal at high-speed rotating frequency portion so that stead state error within the error signal is lowered.

A third object of this invention is to provide a signal compensation device for a high-speed optical disk system capable of processing the error signal at high-speed rotating frequency portion so that stead state error within the error signal is lowered, wherein the high-speed rotating frequency portion of the signal is processed by a bandpass filter.

To achieve these and other advantages and in accordance with the purpose of the invention, as embodied and broadly described herein, the invention provides a signal-compensating device for an optical storage device. The compensation device includes a lead compensator, a lag compensator, and a bandpass filter. The lead compensator picks up error signal from the optical system. The lag compensator is connected to the lead compensator for receiving signal from the lead compensator. The bandpass filter (BPF) also picks up error signal from the optical system and then amplifies the rotating frequency portion of the error signal. Finally, signal generated by the lag compensator and the amplified signal produced by the bandpass filter is summed and then transferred to the actuator of the optical system, thereby lowering stead state error of the error signal. Since the rotating frequency portion of the error signal is processed by a bandpass filter, problems generally associated with a conventional optical system due to insufficient frequency bandwidth are eliminated.

The invention provides an alternative signal-compensating device for an optical storage device. The compensation device includes a lead compensator, a lag compensator, and a bandpass filter. The lead compensator picks up an error signal from the optical system to produce a first output signal. Similarly, the lag compensator picks up the error signal from the optical system to produce a second output signal. The bandpass filter picks up the error signal from the optical system and amplifies the rotating frequency portion of the error signal to produce a third output signal. The first, the second and the third output signals are summed to produce a resulting signal. Finally, the summed signal is transferred to the actuator of the optical system. The rotating frequency portion of the error signal is processed by a bandpass filter. Hence, problems generally associated with a conventional optical system due to insufficient frequency bandwidth are eliminated.

This invention also provides a method for compensating the signal of an optical storage device. Error signal produced by the optical storage device is fed to a lead compensator, a lag compensator and a bandpass filter. The bandpass filter processes the error signal in the rotating frequency portion. Output signals from the lead compensator, the lag compensator, and the bandpass filter are summed into a compensated error signal for lowing a steady state error of the error signal This invention also provides another method for compensating the signal of an optical storage device. Error signal produced by the optical storage device is fed to a lead compensator and a bandpass filter. The bandpass filter processes the error signal in the rotating frequency portion and thereby generates a filtered error signal. Output signal from the lead compensator is fed to a lag compensator, whereby a lead-lag compensated error signal is generated. The filtered error signal and the lead-lag compensated error signal are summed into a compensated error signal for lowing a steady state error of the error signal.

In the above method, the error signal fed into the compensator can pass sequentially through a lead compensator and then a lag compensator for signal compensation. Alternatively, the error signal fed into the compensator can be diverted to the lead compensator and the lag compensator for signal compensation simultaneously and then summed to produce an output from the compensator. The method utilizes the bandpass filter to process the high-speed rotating frequency portion of the error signal. Hence, problems generally associated with a conventional optical system due to insufficient frequency bandwidth are eliminated.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 2A and 2B are two different conventional lead-lag compensator architectures;

DESCRIPTION OF THE PREFERRED EMBODIMENTS

Figure 1:
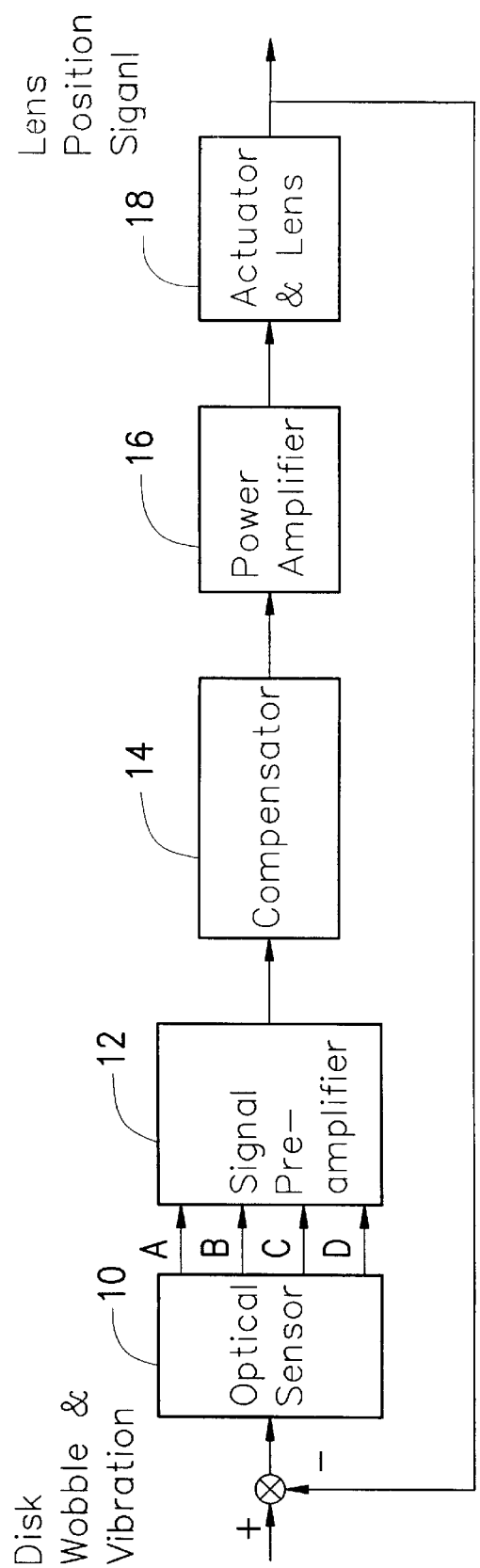
FIG. 1 is a block diagram showing the architecture of a conventional focus and track servo system.

Reference will now be made in detail to the present preferred embodiments of the invention, examples of which are illustrated in the accompanying drawings. Wherever possible, the same reference numbers are used in the drawings and the description to refer to the same or like parts.

This invention provides a method and device for compensating the error signal produced in an optical storage device. The storage is, such as CD-ROM drive or DVD-ROM drive. The concept of this invention is the utilization of a bandpass filter to process the rotating frequency portion of the signal when the spindle motor is spinning at a high speed. Device architectures and method provided by the invention is suitable for controlling operated in constant angular velocity (CAV) mode, or in constant linear velocity (CL) mode.

Figure 3A:
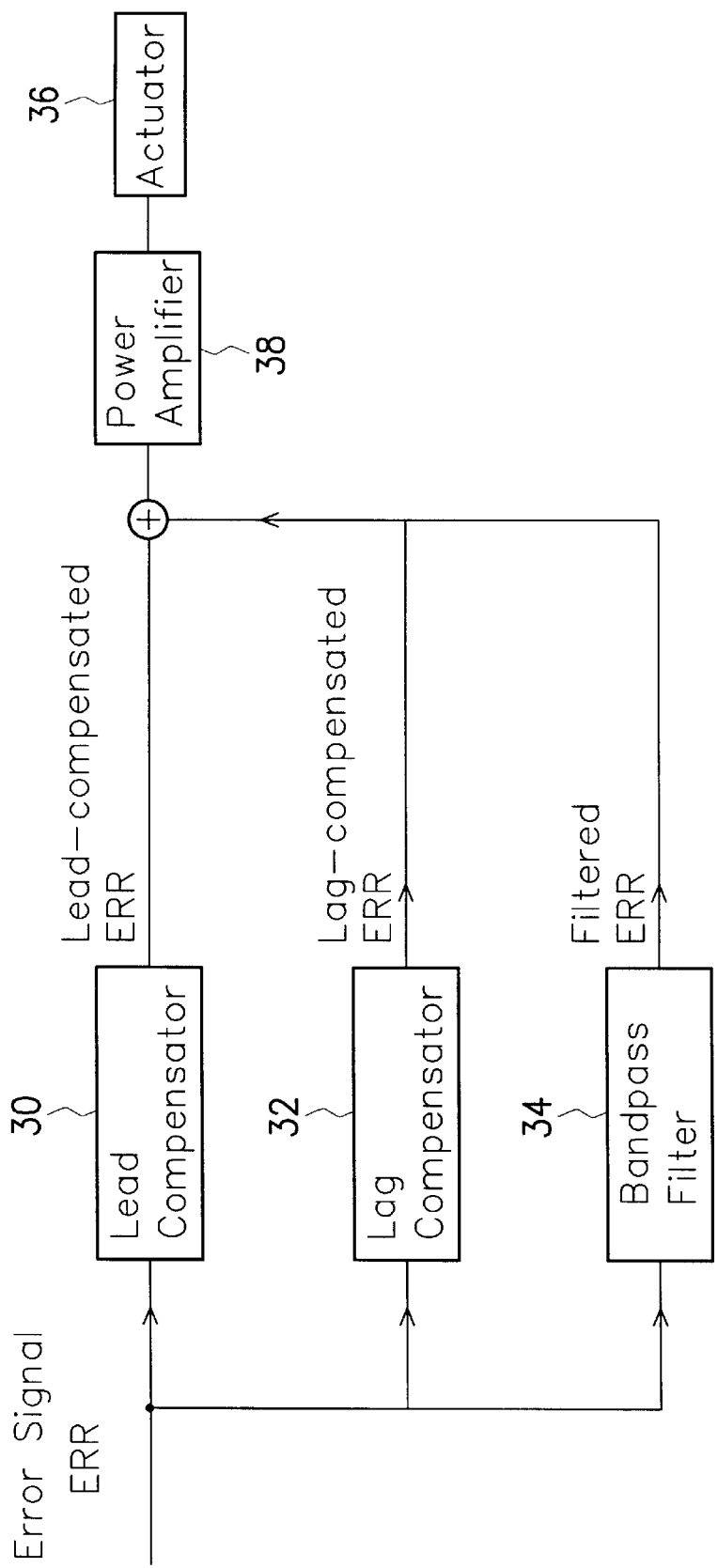
FIG. 3A is a block diagram showing the architecture of a signal compensation system according to a first embodiment of this invention.

FIG. 3A is a block diagram showing the architecture of a signal compensation system according to a first embodiment of this invention. The lead compensator 30 and the lag compensator 32 can have a structure similar to the lead compensator and lag compensator of a conventional one. In other word, the lead compensator can be a differentiator circuit such as a high frequency filter capable of stabilizing any input signal while the lag compensator can be an integrator circuit capable of lowering the steady state error.

As shown in FIG. 3A, an error signal ERR from an optical device is transferred to the lead compensator 30, the lag compensator 32 and the bandpass filter 34 simultaneously. The bandpass filter 34 amplifies signal near the rotating frequency of the spindle motor. In this embodiment, the bandpass filter 34 is employed to process high-speed rotating frequency so that rotating frequency of the motor is magnified.

Output signals from the lead compensator 30, the lag compensator 32 and the bandpass filter 34 are summed, and then input to provide a signal to a power amplifier 38. Output signal from the power amplifier is then passed to an actuator 36. Output signal produced by the summation of output signals from the lead compensator 30, the lag compensator and the bandpass filter 34 is capable of compensating the error signal at high-speed rotating frequency in an optical storage device. Hence, the steady state error within the error signal is lowered.

According to the invention, the high-speed rotating frequency signal of the error signal ERR is processed by the bandpass filter 34. Therefore, frequency bandwidth design for the lead compensator 30 and the lag compensator 32 is much easier. Hence, even under high frequency rotation, the bandpass filter 34 is capable of lowering the steady state error of high speed rotating frequency and meeting the specification of the optical device.

Figure 3B:
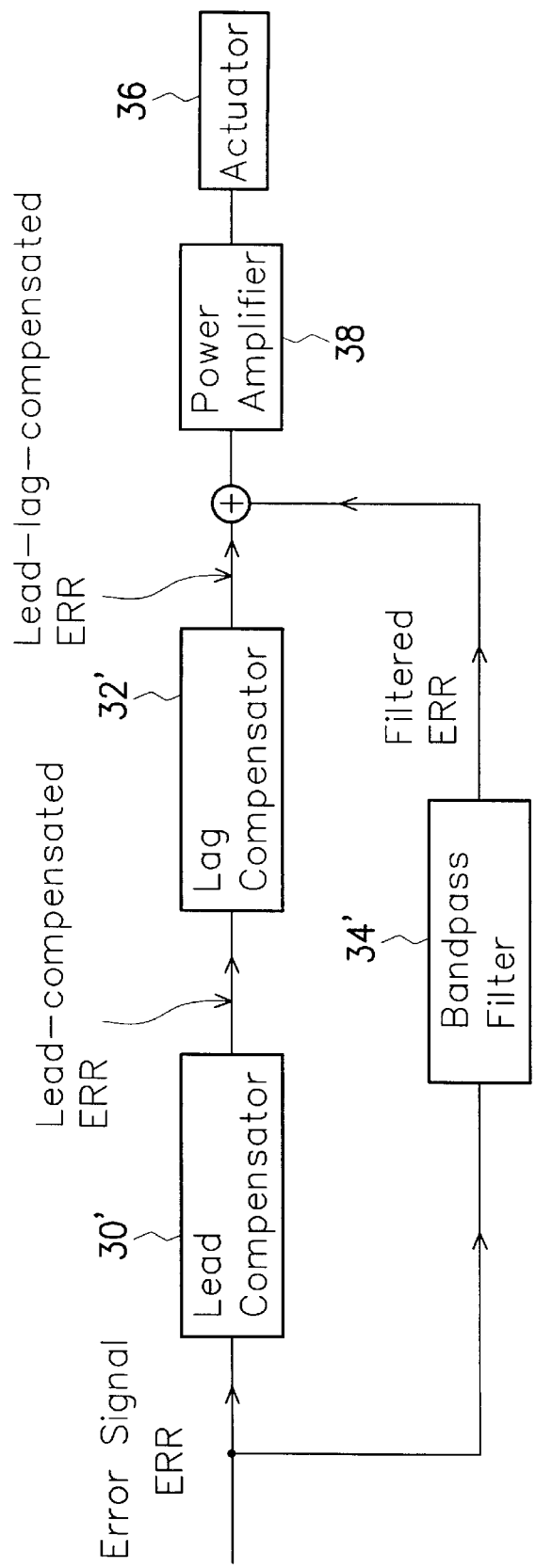
FIG. 3B is a block diagram showing the architecture of a signal compensation system according to a second embodiment of this invention.

FIG. 3B is a block diagram showing the architecture of a signal compensation system according to a second embodiment of this invention. In FIG. 3A, the lead compensator 30 and the lag compensator 32 in the signal compensation system are connected in parallel. The lead compensator 30' and lag compensator 32' shown in FIG. 3B, on the other hand, are serially connected.

As shown in FIG. 3B, the error signal ERR is simultaneously transmitted to the lead compensator 30' and the bandpass filter 34'. After error signal is transferred to the lag compensentor 32' for subsequent processing. The bandpass filter 34' is used for amplifying signal near the rotating frequency of the spindle motor similar to the bandpass filter shown in FIG. 3A. In this embodiment, the bandpass filter 34' is employed to process high-speed rotating frequency so that rotating frequency of the motor is magnified.

Output signals from the lag compensator 32' and the bandpass filter 34' are summed together and subsequently transferred to a power amplifier. The amplified signal from the power amplifier is transmitted to the actuator of the optical device. The summation signal from the lag compensator 32' and the bandpass filter 34' is capable of compensating the high-speed rotating frequency portion of the error signal so that steady state error within the error signal is lowered. Hence, even under high frequency rotation, the bandpass filter 34' is capable of lowering the steady state error of high speed rotating frequency and meeting the specification of the optical device.

In addition, this invention also provides a method for compensating the error signal of a high-speed optical storage device. The error signal is first sent to a compensator and a bandpass filter. The bandpass filter processes the high-speed frequency transfer signal within the error signal. Finally, output signal produced by the compensator and the bandpass filter is summed.

When the error signal enters the compensator, the error signal can be processed by many methods. For example, the error signal can be sequentially processed by the lead compensator and the lag compensator (the architectural layout in FIG. 3B). Alternatively, the error signal can be transferred to the lead and the lag compensator and processed in parallel. The processed signals from the lead and the lag compensator are summed to produce an output signal (the architectural layout in FIG. 3A). In this invention, the high-speed rotating frequency portion of the error signal is processed by a bandpass filter. Hence, problems generally associated with a conventional optical system due to insufficient bandwidth are eliminated.

Figure 4A:
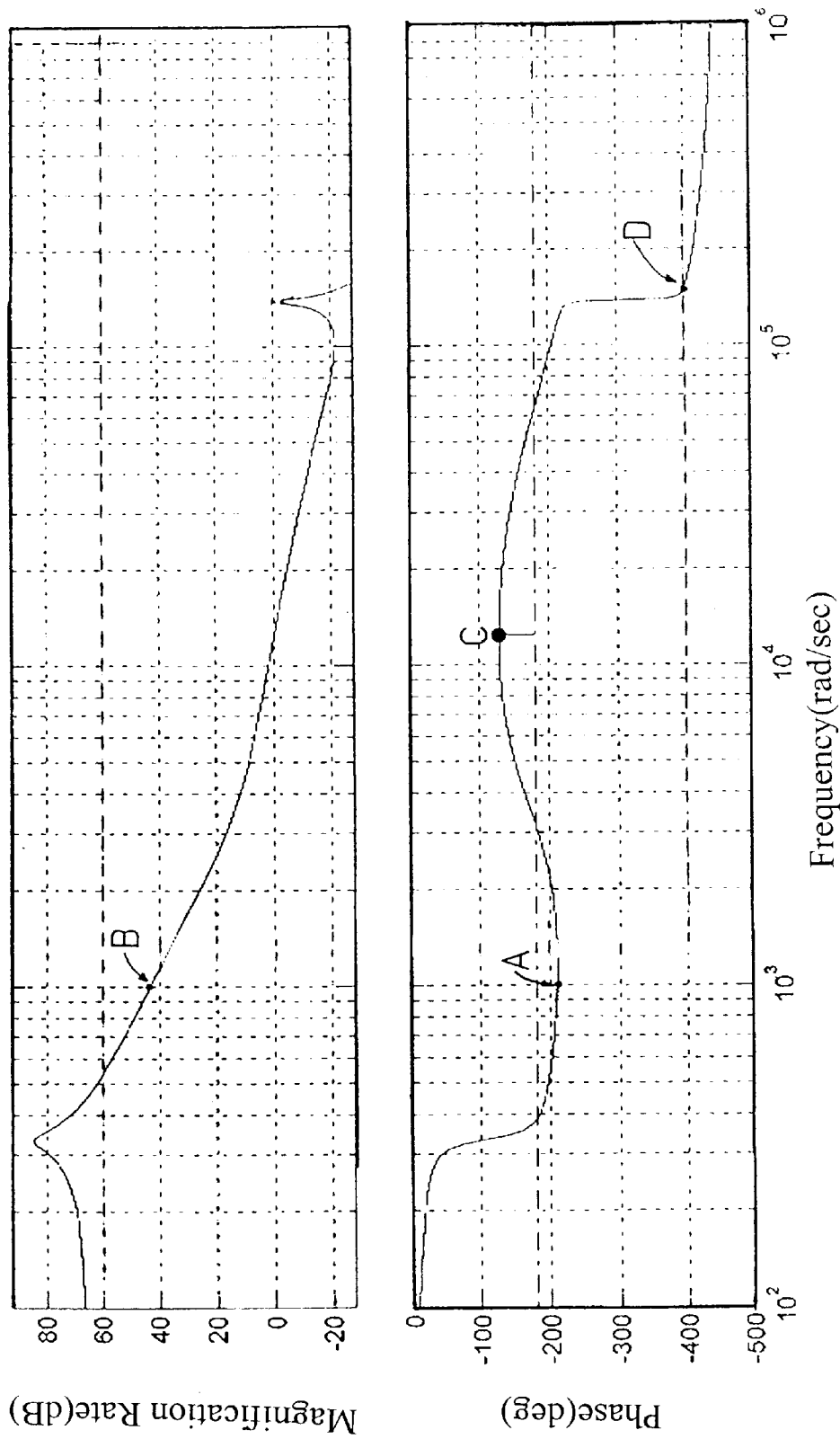
FIG. 4A is a bode plot of the open loop transfer function of a conventional lead-lag compensator.
Figure 4B:
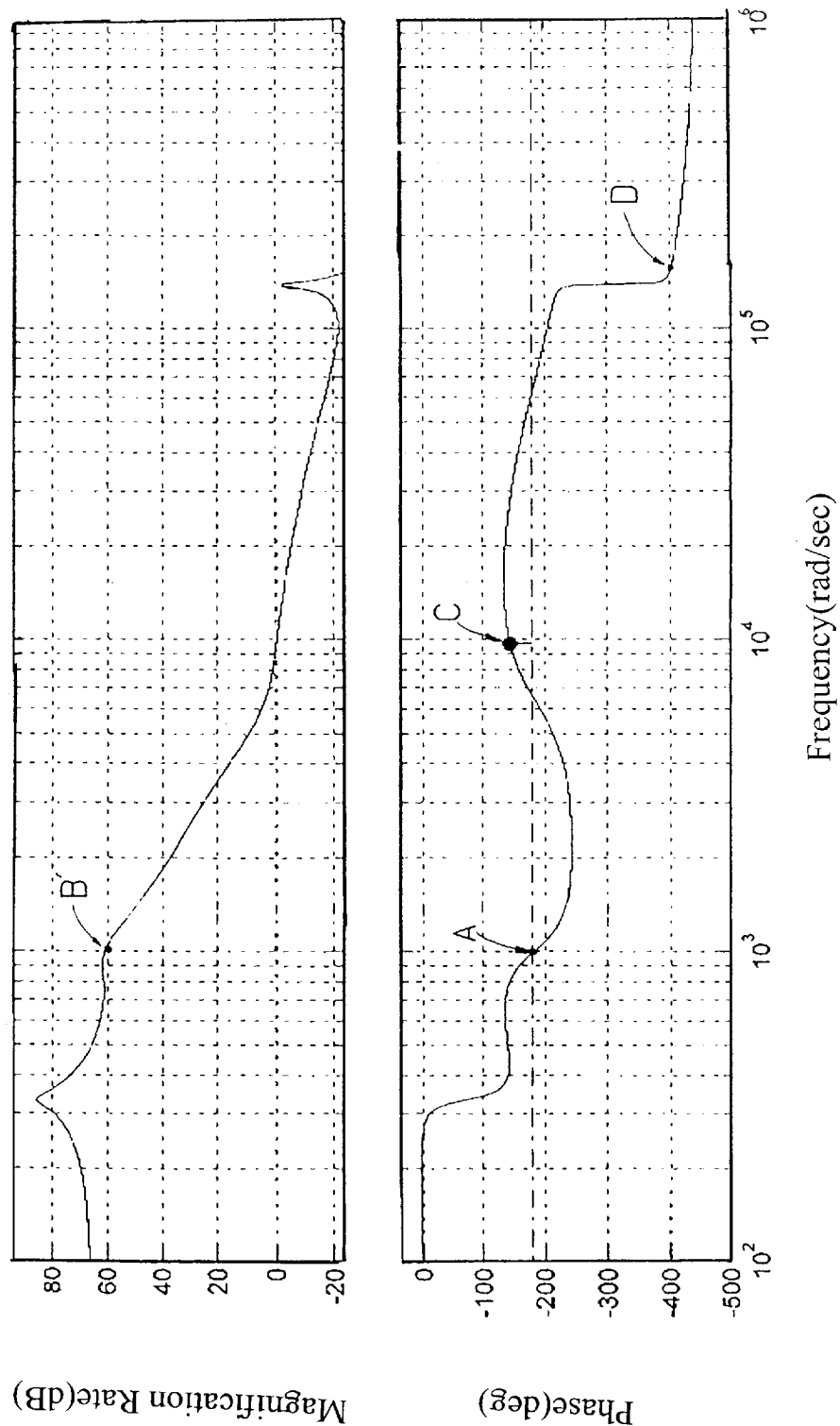
FIG. 4B is a bode plot of the open loop transfer function of the lead-lag compensator according to this invention.

FIG. 4A is a bode plot of the open loop transfer function of a conventional lead-lag compensator. FIG. 4B is a bode plot of the open loop transfer function of the lead-lag compensator according to this invention. In FIGS. 4A and 4B, points A and A' indicate the rotating frequency in a 48× the optical storage device. Points B and B' indicate the magnification rate in dB. Point C indicates frequency bandwidth position while point D indicates second resonance position. In general, the frequency bandwidth must not exceed the second resonance. In FIG. 4A, the signal magnification rate is about 44 dB (point B) in the neighborhood of point A. This magnification rate is far below the specified requirement of 54 dB. On the other hand, the signal magnification rate in the neighborhood of point A' in FIG. 4B is about 62 dB (B' point), well beyond the specified value of 54 dB. Hence, the lead-lag compensator/bandpass filter system of this invention can compensate for the high-speed rotating frequency portion of the error signal and lower the steady state error.

In summary, the advantages of the method of compensating the signal of a high-speed disk system in this invention include:

1. The steady state error signal within the error signal can be lowered, especially in a high-speed storage device.

2. A bandpass filter is employed to lower the steady state error signal within the error signal so that circuit structure is simplified.

3. Problems caused by insufficient frequency bandwidth of compensating circuit are resolved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A compensation device for compensating an error signal in an optical storage device, comprising:
    a lead compensator for receiving the error signal and generating a lead compensated error signal;
    a lag compensator for receiving the lead compensated error signal and generating a lead-lag compensated error signal based on the error signal; and
    a bandpass filter for magnifying a rotating frequency portion of the error signal and generating a filtered error signal,
    wherein the filtered error signal and the lead-lag compensated error signal are summed for lowering a steady state error of the error signal.

2. The device of claim 1, wherein the lead compensator acts as a differentiator.

3. The device of claim 1, wherein the lag compensator acts as an integrator.

4. The device of claim 1, wherein the rotating frequency portion of the error signal magnified by the bandpass filter comprises a high-speed rotating frequency portion.

5. A compensation device for compensating the error signal of an optical storage device, comprising:
    a lead compensator for receiving the error signal and generating a lead compensated error signal;
    a lag compensator for receiving the error signal and generating a lag compensated error signal; and
    a bandpass filter for magnifying a rotating frequency portion of the error signal and generating a filtered error signal based on the error signal,
    wherein the lead compensated error signal, the lag compensated error signal and the filtered error signal are summed for lowering a steady state error of the error signal.

6. The device of claim 5, wherein the lead compensator acts a differentiator.

7. The device of claim 5, wherein the lag compensator acts an integrator.

8. The device of claim 5, wherein the rotating frequency portion of the error signal magnified by the bandpass filter comprises a high-speed rotating frequency portion.

9. A method for compensating an error signal applied in an optical storage device, comprising the steps of:
    generating a lead-compensated error signal according to the error signal;
    generating a lag-compensated error signal according to the error signal;
    generating a filter ed error signal according to the error signal; and
    summing the lead-compensated error signal, the lag-compensated error signal, and the filtered error signal for lowering a steady state error of the error signal.

10. The method of claim 9, wherein the lead-compensated error signal is generated by a differentiator.

11. The method of claim 9, wherein the lag-compensated error signal is generated by an integrator.

12. The method of claim 9, wherein the filtered error signal is generated by a bandpass filter.

13. The method of claim 9, wherein the filtered error signal is generated by magnifying rotation frequency portion of the error signal.

14. A method for compensating an error signal, applied in an optical storage device, comprising the steps of:

generating a lead-compensated error signal according to the error signal;

generating a filtered error signal according to the error signal;

generating a lead-lag-compensated signal according to the lead-compensated signal; and summing the filtered error signal and the lead-lag compensated error signal for lowering a steady state error of the error signal.

15. The method of claim 14, wherein the lead-compensated error signal is generated by a differentiator.

16. The method of claim 14, wherein the lag-compensated error signal is generated by an integrator.

17. The method of claim 14, wherein the filtered error signal is generated by a bandpass filter.

18. The method of claim 14, wherein the filtered error signal is generated by magnifying rotation frequency portion of the error signal.

* * * * *